US010368343B2

(12) United States Patent
Sarkar et al.

(10) Patent No.: US 10,368,343 B2
(45) Date of Patent: Jul. 30, 2019

(54) SYSTEMS AND METHODS FOR DOWNLINK SCHEDULING THAT MITIGATE PDCCH CONGESTION

(71) Applicant: Telefonaktiebolaget L M Ericsson (publ), Stockholm (SE)

(72) Inventors: Debasish Sarkar, Irvine, CA (US); Ayan Sen, Gurgaon (IN); Jaspal Singh, Gurgaon (IN); Narendra Kumar Singh, Delhi (IN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 116 days.

(21) Appl. No.: 14/722,386

(22) Filed: May 27, 2015

(65) Prior Publication Data
US 2016/0353415 A1 Dec. 1, 2016

(51) Int. Cl.
H04W 72/04 (2009.01)
H04W 72/08 (2009.01)
H04W 72/12 (2009.01)

(52) U.S. Cl.
CPC ..... H04W 72/042 (2013.01); H04W 72/0446 (2013.01); H04W 72/085 (2013.01); H04W 72/1289 (2013.01); H04W 72/1273 (2013.01)

(58) Field of Classification Search
CPC ............. H04W 72/042; H04W 72/0446
(Continued)

(56) References Cited

U.S. PATENT DOCUMENTS 5,729,541 A * 3/1998 Hamalainen ......... H04B 7/2656
370/337
8,681,729 B2 * 3/2014 Wengerter ............ H04L 1/0072
370/329
(Continued)

FOREIGN PATENT DOCUMENTS

WO 2009022309 A2 2/2009

OTHER PUBLICATIONS

Author Unknown, "Technical Specification Group Radio Access Network; Evolved Universal Terrestrial Radio Access (E-UTRA); Physical layer procedures (Release 12)," Technical Specification 36.213, Version 12.5.0, 3GPP Organizational Partners, Mar. 2015, 239 pages.
(Continued)

Primary Examiner — Peter G Solinsky
(74) Attorney, Agent, or Firm — Withrow & Terranova, PLLC

(57) ABSTRACT

Systems and methods are disclosed for improving Physical Downlink Control Channel (PDCCH) allocation for improved downlink scheduling. In some embodiments, a method of operation of a network node in a cellular communications network comprises transmitting a downlink assignment to a wireless device, the downlink assignment comprising an indication of whether the downlink assignment applies to a single Transmit Time Interval (TTI) or multiple consecutive TTIs, and transmitting a downlink data transmission to the wireless device during a single TTI or multiple downlink data transmissions to the wireless device during multiple consecutive TTIs according to the downlink assignment. In this manner, the network node does not need to transmit, and the wireless device does not need to receive/decode, a separate downlink assignment in each
(Continued)

TTI. This may be beneficial to, e.g., mitigate PDCCH congestion.

32 Claims, 12 Drawing Sheets

(58) Field of Classification Search
USPC .......................................................... 370/336
See application file for complete search history.

(56) References Cited

U.S. PATENT DOCUMENTS

| | | | | |
|---|---|---|---|---|
| 2007/0149138 | A1* | 6/2007 | Das ...................... | H04L 1/0045 455/68 |
| 2007/0243894 | A1* | 10/2007 | Das ...................... | H04L 1/0002 455/522 |
| 2008/0273513 | A1* | 11/2008 | Montojo ............... | H04L 1/1607 370/342 |
| 2009/0257408 | A1* | 10/2009 | Zhang .................. | H04L 1/1621 370/336 |
| 2009/0290559 | A1* | 11/2009 | Pelletier ............... | H04L 1/189 370/336 |
| 2010/0189093 | A1* | 7/2010 | Palanki ................ | H04W 52/16 370/344 |
| 2011/0026625 | A1* | 2/2011 | Susitaival ........... | H04W 52/0251 375/260 |
| 2012/0127946 | A1* | 5/2012 | Nishio .................. | H04L 1/0038 370/329 |
| 2012/0218969 | A1* | 8/2012 | Tan ....................... | H04L 5/005 370/329 |
| 2013/0142175 | A1* | 6/2013 | Manssour ............ | H04W 72/1252 370/336 |
| 2013/0223412 | A1* | 8/2013 | Sambhwani .......... | H04W 28/18 370/336 |
| 2014/0198733 | A1* | 7/2014 | Yin ...................... | H04W 72/0446 370/329 |
| 2015/0009953 | A1* | 1/2015 | Park .................... | H04W 72/1273 370/330 |
| 2015/0180619 | A1* | 6/2015 | Majjigi ................ | H04L 5/0005 370/330 |
| 2015/0208415 | A1* | 7/2015 | Xu ....................... | H04L 5/001 370/329 |
| 2015/0215082 | A1* | 7/2015 | Agiwal ................ | H04L 1/1822 370/336 |
| 2015/0305058 | A1* | 10/2015 | Hammarwall ....... | H04W 72/1278 370/280 |
| 2015/0372798 | A1* | 12/2015 | Zhao .................... | H04L 5/14 370/280 |
| 2016/0050577 | A1* | 2/2016 | Rao ...................... | H04W 48/18 370/252 |
| 2016/0142933 | A1* | 5/2016 | Rastogi .............. | H04W 72/1247 370/230 |
| 2016/0219518 | A1* | 7/2016 | Zhao .................. | H04W 52/0225 |
| 2016/0227523 | A1* | 8/2016 | Desai .................. | H04W 72/042 |
| 2016/0227538 | A1* | 8/2016 | Seo ..................... | H04B 7/2615 |
| 2016/0242176 | A1* | 8/2016 | Sun .................... | H04W 72/0446 |
| 2016/0262176 | A1* | 9/2016 | Moulsley ............ | H04W 72/042 |
| 2016/0295584 | A1* | 10/2016 | Chen .................. | H04W 72/0446 |

OTHER PUBLICATIONS

Huawei, et al., "R1-130892: Analysis on control signaling enhancements," 3rd Generation Partnership Project (3GPP), TSG RAN WG1 Meeting #72b, Apr. 15-19, 2013, 4 pages, Chicago, USA.
International Search Report and Written Opinion for International Patent Application No. PCT/IB2016/053043, dated Jul. 28, 2016, 12 pages.

* cited by examiner

|  | TTI | TTI | TTI | TTI |
|---|---|---|---|---|
| SINGLE TTI ASSIGNMENT (DCI BITS = 00) | DL ASSIGNMENT + DL DATA | DL ASSIGNMENT + DL DATA | DL ASSIGNMENT + DL DATA | DL ASSIGNMENT + DL DATA |
| 2 CONTINUOUS TTI ASSIGNMENT (DCI BITS = 01) | DL ASSIGNMENT + DL DATA | DL DATA (NO DL ASSIGNMENT) | DL ASSIGNMENT + DL DATA | DL DATA (NO DL ASSIGNMENT) |
| 3 CONTINUOUS TTI ASSIGNMENT (DCI BITS = 10) | DL ASSIGNMENT + DL DATA | DL DATA (NO DL ASSIGNMENT) | DL DATA (NO DL ASSIGNMENT) | DL ASSIGNMENT + DL DATA |
| 4 CONTINUOUS TTI ASSIGNMENT (DCI BITS = 11) | DL ASSIGNMENT + DL DATA | DL DATA (NO DL ASSIGNMENT) | DL DATA (NO DL ASSIGNMENT) | DL DATA (NO DL ASSIGNMENT) |

*FIG. 9*

SYSTEMS AND METHODS FOR DOWNLINK SCHEDULING THAT MITIGATE PDCCH CONGESTION

TECHNICAL FIELD

The present disclosure relates to Physical Downlink Control Channel (PDCCH) allocation.

BACKGROUND

In Third Generation Partnership Project (3GPP) Long Term Evolution (LTE), including LTE-Advanced, Physical Downlink Control Channels (PDCCHs) are used to transmit various types of information from the network (i.e., from the enhanced or evolved Node B (eNB)) to mobile terminals (i.e., User Equipment devices (UEs)). In particular, PDCCHs are used to transmit the following messages:

- Downlink scheduling assignments, including Physical Downlink Shared Channel (PDSCH) resource indication, transport format, Hybrid Automatic Repeat Request (HARQ) information, transport block size, Multiple Input Multiple Output (MIMO) related control information (if applicable), and Physical Uplink Control Channel (PUCCH) power control commands,
- Uplink scheduling grants, including Physical Uplink Shared Channel (PUSCH) resource indication, transport format, HARQ related information, and PUSCH power control commands, and
- Power control commands for groups of UEs, or terminals (as a complement to the power control commands piggy-backed with the scheduling decisions).

A PDCCH carries one of the above messages. As multiple mobile terminals can be scheduled simultaneously, on both downlink and uplink, there must be a possibility to transmit multiple scheduling messages within each subframe. Each scheduling message is transmitted on a separate PDCCH. Consequently, there are typically multiple PDCCHs in each cell, and each mobile terminal monitors multiple PDCCHs.

The different scheduling messages have different payload sizes. For example, a downlink scheduling grant supporting spatial multiplexing with non-contiguous allocation of resource blocks in the frequency domain requires a larger payload size than an uplink scheduling grant supporting frequency-contiguous allocations only. Link adaptation, i.e., to match the code rate of the error-correcting code of the PDCCH to the instantaneous radio conditions, is also supported. Thus, there are multiple formats for the PDCCH where each format is defined by the payload size and the code rate.

The processing of the PDCCH is illustrated in FIG. 1. As illustrated, a Cycle Redundancy Check (CRC) is attached to each PDCCH payload, where the Medium Access Control (MAC) Identifier (ID) (Radio Network Temporary Identifier (RNTI)) is included in the CRC calculation. Upon reception of a PDCCH, the mobile terminal will check the CRC using its own RNTI. If the CRC checks, the message provided on that PDCCH is declared to be correctly received and intended for the mobile terminal. Thus, the identity of the mobile terminal that is supposed to receive the PDCCH message is implicitly encoded in the CRC and not explicitly transmitted.

After CRC attachment follows channel coding with a 1/3 rate tail-biting convolution code, rate matching, and Quadrature Phase Shift Keying (QPSK) modulation. Depending on the PDCCH message size and the channel coding rate (including rate matching), the size of the coded PDCCH corresponds to 1, 2, 4, or 8 Control Channel Elements (CCEs), where each CCE corresponds to 36 resource elements or 9 Resource Element Groups (REGs) as shown in FIG. 2.

The coded and modulated PDCCHs are multiplexed such that all CCEs corresponding to the first PDCCH are followed by all the CCEs corresponding to the second PDCCH and so on. The multiplexed CCEs are then mapped to resource elements, which is described as an interleaving of groups of four QPSK symbols followed by a cell-specific cyclic shift. Groups of four QPSK symbols are used for the same reasons as for the Physical Control Format Indicator Channel (PCFICH), namely to support the different transmit diversity schemes, and the cyclic shift serves the purpose of randomizing the mapping between different cells. Resource elements not used for PCFICH, Physical HARQ Indicator Channel (PHICH), or reference signals in the control region are used for transmission of the PDCCH. Furthermore, to obtain an even power distribution between the Orthogonal Frequency Division Multiplexing (OFDM) symbols and to allow for flexible power control, the mapping is done such that each CCE spans all OFDM symbols in the control region.

Each PDCCH (or enhanced PDCCH (ePDCCH)) supports multiple Downlink Control Information (DCI) formats. The format used for a particular PDCCH is unknown to the mobile terminal and, as such, the mobile terminal needs to blindly detect the PDCCH. While the CCE structure described above helps to reduce the number of blind decoding attempts, LTE utilizes so called "search spaces" to further reduce the number of blind decoding attempts needed at the mobile terminal. A search space is a set of candidate channels formed by CCEs at a given aggregation level that the mobile terminal is supposed to attempt to decode. In general, there are two types of search spaces, namely, a common search space and a UE-specific search space. One example of a common search space and UE-specific search spaces is illustrated in FIG. 3. The idea is to send information intended for all or several UEs in the common search space, e.g. indications about paging. All UEs monitor the common search space on PDCCH. The UE-specific search space is intended for only one UE. It can consist of, e.g., scheduling grants for transmitting uplink data. The UE will use its RNTI (UE specific or temporary Cell RNTI (C-RNTI)) to find its specific search space. Furthermore, both common and UE-specific search spaces have PDCCH format restrictions, as shown in the table below.

TABLE 1

| Type | Number of CCEs | Size [in CCEs] | Number of PDCCH Candidates |
| --- | --- | --- | --- |
| UE-Specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

Notably, Table 1 is in accordance with 3GPP TS 36.213 Section 9.1.1 describing the PDCCH assignment procedure. The CCEs corresponding to PDCCH candidate m of the search space $S_k^{(L)}$ are given by $$L \cdot \{(Y_k+m) \bmod [N_{CCE,k}/L]\}+i$$

where $Y_k$ is defined in the standard, i=0, ..., (L−1) and m=0, ..., $M^{(L)}$−1. $M^{(L)}$ is the number of PDCCH candidates to monitor in the given search space. In Table 1, "Number of CCEs" represents the aggregation level (L) corresponding to search space $S_k^{(L)}$ and "Number of PDCCH Candidates" corresponds to $M^{(L)}$ in the above equation.

The downlink assignments consist of resource block indication, modulation and transport block size, HARQ related information, PUCCH power control commands, and (if applicable) information related to spatial multiplexing. Resource block indications can be of three different types: 0, 1, and 2. Type 0 and 1 use a bitmap to support non-contiguous allocations in the frequency domain. In type 0, each bit in the bitmap represents a group of n contiguous resource blocks, where n is given by the downlink system bandwidth. The reason for grouping resource blocks is to reduce the size of the bitmap; a bitmap with the resolution of one resource block in the frequency domain would result in a too large overhead for larger system bandwidths. However, a frequency resolution of one resource block is also sometimes useful in large system bandwidths. Therefore, type 0 is complemented by type 1, where the resource blocks are divided into subsets as shown in FIG. 4, which illustrates the different types of downlink resource block assignments. Within the subset used, a bitmap indicates upon which resource blocks the PDSCH is transmitted. For resource allocation Type 2, a Resource Indication Value (RIV) is transmitted that indicates where the contiguous resource blocks start and the length in terms of virtually contiguously allocated resource blocks.

The downlink scheduling assignments are sent to the UE on PDCCH as DCI. The DCI on the PDCCH has several supported formats, as shown in Table 2 below.

TABLE 2

| DCI Format on PDCCH | Resource Allocation Type | Use |
|---|---|---|
| DCI 0 | "Type 2" | Scheduling of PUSCH |
| DCI 1 | Type 0/1 | One PDSCH code word |
| DCI 1A | Type 2 | One PDSCH code word or Random access procedure |
| DCI 1B | Type 2 | One PDSCH code word with precoding information |
| DCI 1C | Type 2 | One PDSCH code word |
| DCI 1D | Type 2 | One PDSCH code word with precoding and power offset information |
| DCI 2 | Type 0/1 | CL spatial multiplexing |
| DCI 2A | Type 0/1 | OL spatial multiplexing |
| DCI 3 | "Type 2" | Power Control, 2-bit power adjustment |
| DCI 3A | "Type 2" | Power Control, 1-bit power adjustments |

DCI format 0 is for uplink and uses an allocation type similar to resource allocation type 2. DCI formats 1, 2, and 2A use resource allocation type 0, which is a bitmap pointing out the allocated resource blocks. DCI format 1A uses resource allocation type 2, which indicates start and length of the allocation of resource blocks, i.e. RIV. DCI format 1 is used for transmit diversity, while DCI format 2 is used for closed loop spatial multiplexing and DCI format 2A is used for open loop spatial multiplexing. DCI formats 1, 2, and 2A could use type 0 or type 1 resource allocation. This is solved by a single bit resource allocation header field which exists depending on the downlink system bandwidth where type 0 is indicated by 0 value and type 1 is indicated otherwise.

As an example, DCI format 1A consists of the following information:

1 bit for the format flag for PDSCH allocation
   Used to indicate $N_{RB}$ assignment for Random Access RNTI (RA-RNTI), Paging RNTI (P-RNTI), or System Information RNTI (SI-RNTI)
1 bit to indicate localized/distributed Virtual Resource Block (VRB) assignment
N bits for the resource block assignment (depends on $N^{DL}_{RB}$)
5 bits for the Modulation and Coding Scheme (MCS)
3 bits (Frequency Division Duplexing (FDD)) or 4 bits (Time Division Duplexing (TDD)) HARQ process number
1 bit for new data indicator (indicates gap size for overhead messages)
2 bits for Redundancy Version (RV)
2 bits for Transmit Power Control (TPC) command for PUCCH
2 bits for Downlink Assignment Index (DAI) (TDD only)

Zeros are used to pad out the message to fit the correct block size.

One issue with conventional PDCCH is that, with an increasing number of UEs, the eNB scheduler is not able to fulfill the scheduling requirements of all UEs because of the limitation on the number of simultaneous PDCCHs. This leads to a condition of PDCCH congestion. Similarly, if there are many Guaranteed Bit Rate (GBR) UEs (e.g., UEs using Voice over LTE (VoLTE) services), this will also lead to PDCCH congestion because the eNB scheduler is not able to cope with the delay requirements of GBR UEs. Thus, there is a need for systems and methods for mitigating PDCCH congestion.

SUMMARY

Systems and methods are disclosed for improving Physical Downlink Control Channel (PDCCH) allocation for improved downlink scheduling. In some embodiments, a method of operation of a network node in a cellular communications network comprises transmitting a downlink assignment to a wireless device, the downlink assignment comprising an indication of whether the downlink assignment applies to a single Transmit Time Interval (TTI) or multiple consecutive TTIs, and transmitting a downlink data transmission to the wireless device during a single TTI or multiple downlink data transmissions to the wireless device during multiple consecutive TTIs according to the downlink assignment. In this manner, the network node does not need to transmit, and the wireless device does not need to receive/decode, a separate downlink assignment in each TTI. This may be beneficial to, e.g., mitigate PDCCH congestion.

In some embodiments, the indication in the downlink assignment indicates that the downlink assignment applies to multiple consecutive TTIs, and transmitting comprises transmitting multiple downlink data transmissions to the wireless device during the multiple consecutive TTIs according to the downlink assignment.

In some embodiments, the downlink assignment assigns the same physical resources for the multiple downlink data transmissions in the multiple consecutive TTIs.

In some embodiments, transmitting the downlink assignment to the wireless device comprises transmitting the downlink assignment to the wireless device during a first TTI of the multiple consecutive TTIs and transmitting the multiple downlink data transmissions to the wireless device during the multiple consecutive TTIs comprises transmitting a first downlink data transmission to the wireless device during the first TTI according to the downlink assignment transmitted during the first TTI and transmitting a second downlink data transmission to the wireless device during a second TTI of the multiple consecutive TTIs according to the downlink assignment transmitted during the first TTI.

In some embodiments, transmitting the downlink assignment to the wireless device comprises transmitting the downlink assignment to the wireless device via a Downlink Control Information (DCI) message comprising the indication of whether the downlink assignment applies to a single TTI or multiple consecutive TTIs. Further, in some embodiments, if the indication indicates that the downlink assignment applies to multiple consecutive TTIs, the indication is further indicative of the number of consecutive TTIs in the multiple consecutive TTIs.

In some embodiments, if the indication indicates that the downlink assignment applies to multiple consecutive TTIs, the indication is further indicative of the number of consecutive TTIs in the multiple consecutive TTIs.

In some embodiments, the method further comprises scheduling the downlink data transmission to the wireless device for the multiple consecutive TTIs. Further, in some embodiments, scheduling the downlink data transmission to the wireless device for the multiple consecutive TTIs comprises determining a number of consecutive TTIs to be scheduled for downlink data transmission to the wireless device, the determined number of consecutive TTIs being greater than or equal to 1, and scheduling the multiple downlink data transmissions to the wireless device during the determined number of consecutive TTIs.

In some embodiments, determining the number of consecutive TTIs comprises determining the number of consecutive TTIs to be scheduled for downlink data transmission to the wireless device based on Channel Quality Information (CQI) reported by the wireless device.

In some embodiments, scheduling the downlink data transmissions to the wireless device for the multiple consecutive TTIs further comprises determining whether a multiple TTI assignment procedure is to be performed for the wireless device, wherein determining the number of consecutive TTIs to be scheduled for downlink data transmission to the wireless device and scheduling the multiple downlink data transmissions to the wireless device during the determined number of consecutive TTIs are performed upon determining that the multiple TTI assignment procedure is to be performed for the wireless device.

In some embodiments, scheduling the downlink data transmissions to the wireless device for the multiple consecutive TTIs further comprises determining whether the wireless device supports multiple TTI downlink assignment and determining whether a service type of a service associated with the downlink transmission to the wireless device is a guaranteed bit rate service type, wherein determining the number of consecutive TTIs to be scheduled for downlink data transmission to the wireless device and scheduling the multiple downlink data transmissions to the wireless device during the determined number of consecutive TTIs are performed upon determining that the wireless device supports multiple TTI downlink assignment and determining that the service type of the service associated with the downlink transmission to the wireless device is a guaranteed bit rate service type.

In some embodiments, the determined number of consecutive TTIs is greater than or equal to 2.

Embodiments of a network node are also disclosed.

In some embodiments, a method of operation of a wireless device in a cellular communications network comprises receiving a downlink assignment from a network node, the downlink assignment comprising an indication of whether the downlink assignment applies to a single TTI or multiple consecutive TTIs, and receiving one or more downlink data transmissions on a single TTI or multiple downlink data transmissions during multiple consecutive TTIs according to the downlink assignment.

In some embodiments, the indication in the downlink assignment indicates that the downlink assignment applies to multiple consecutive TTIs, and receiving comprises receiving multiple downlink data transmissions during the multiple consecutive TTIs according to the downlink assignment. In some embodiments, the downlink assignment assigns the same physical resources for the multiple downlink data transmissions in the multiple consecutive TTIs.

In some embodiments, receiving the downlink assignment comprises receiving the downlink assignment during a first TTI of the multiple consecutive TTIs and receiving the multiple downlink data transmissions during the multiple consecutive TTIs comprises receiving a first downlink data transmission during the first TTI according to the downlink assignment received during the first TTI and receiving a second downlink data transmission during a second TTI of the multiple consecutive TTIs according to the downlink assignment received during the first TTI.

In some embodiments, receiving the downlink assignment comprises receiving the downlink assignment via a DCI message comprising the indication of whether the downlink assignment applies to a single TTI or multiple consecutive TTIs. In some embodiments, if the indication indicates that the downlink assignment applies to multiple consecutive TTIs, the indication is further indicative of the number of consecutive TTIs in the multiple consecutive TTIs.

In some embodiments, the indication indicates that the downlink assignment applies to multiple consecutive TTIs, and the indication is further indicative of the number of consecutive TTIs in the multiple consecutive TTIs.

In some embodiments, the method further comprises determining a number of consecutive TTIs being scheduled by the downlink assignment based on the indication comprised in the downlink assignment, the number of consecutive TTIs being greater than or equal to 1, wherein receiving the one or more downlink data transmissions on a single TTI or multiple downlink data transmissions during multiple consecutive TTIs according to the downlink assignment comprises receiving the one or more downlink data transmissions on the determined number of consecutive TTIs according to the downlink assignment.

In some embodiments, the method further comprises determining whether the downlink assignment is in a format that supports multiple consecutive TTI assignment, wherein determining the number of consecutive TTIs being scheduled by the downlink assignment and receiving the one or more downlink data transmissions on the determined number of consecutive TTIs according to the downlink assignment are performed upon determining that the downlink assignment is in a format that supports multiple consecutive TTI assignment.

Embodiments of a wireless device are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 9 is a graphical illustration of multi-TTI downlink assignment according to one example of the present disclosure;

DETAILED DESCRIPTION

Figure 1:
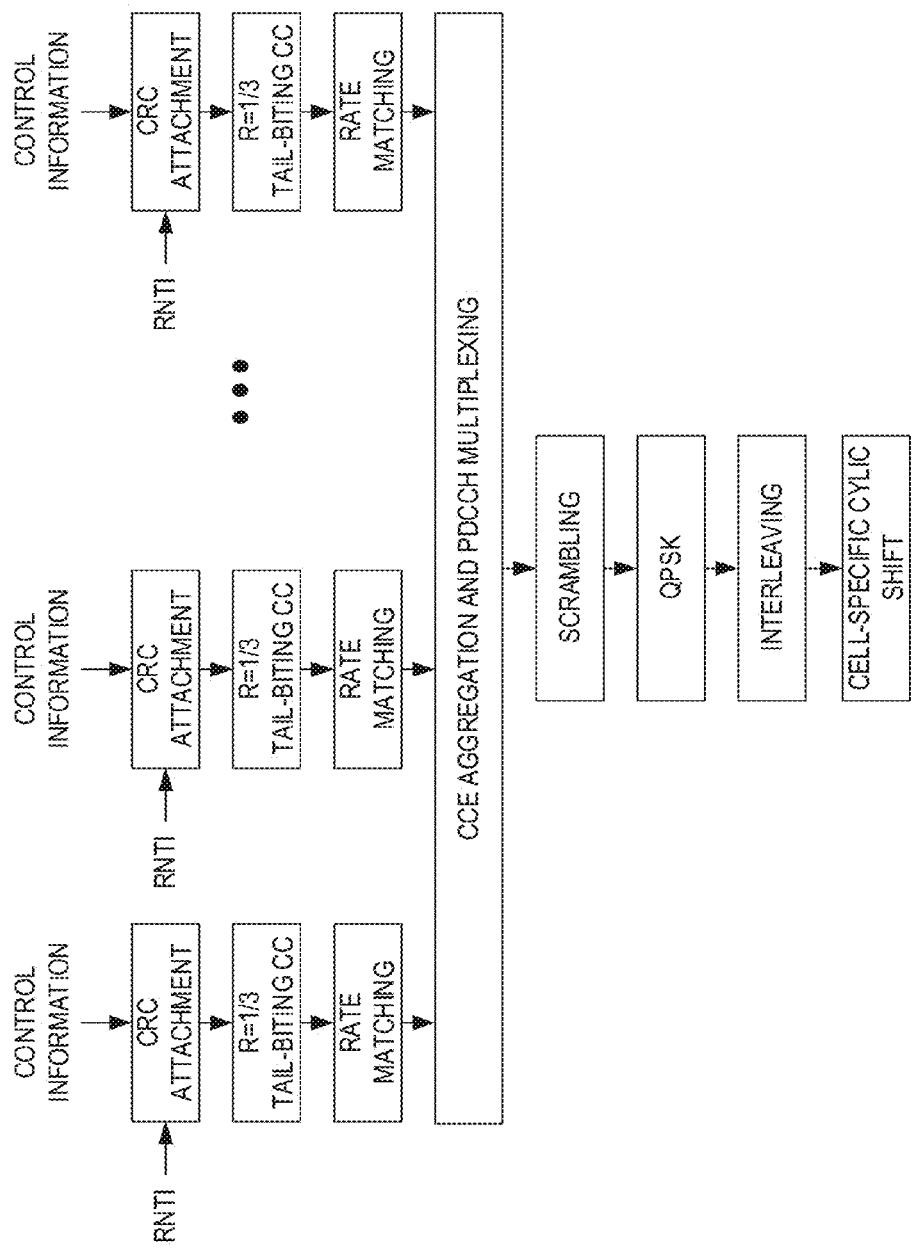
FIG. 1 illustrates Physical Downlink Control Channel (PDCCH) processing.
Figure 2:
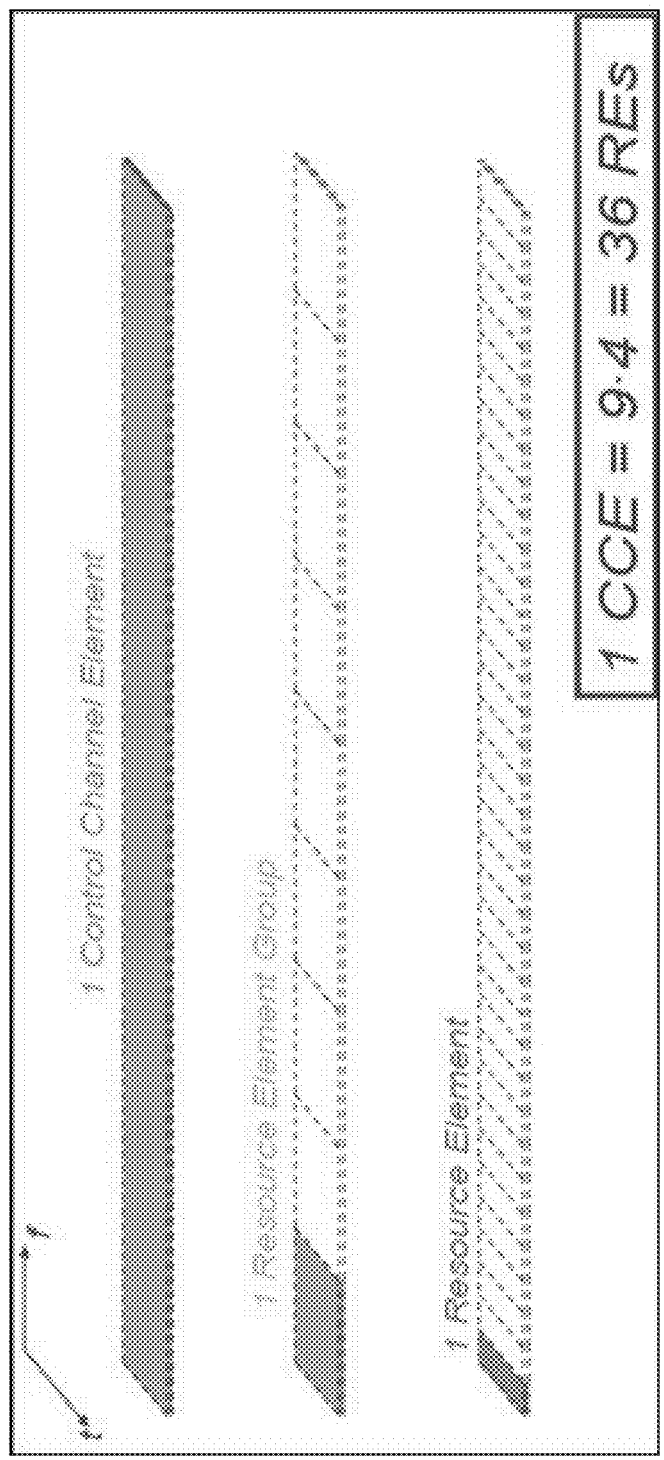
FIG. 2 illustrates a Control Channel Element (CCE)
Figure 3:
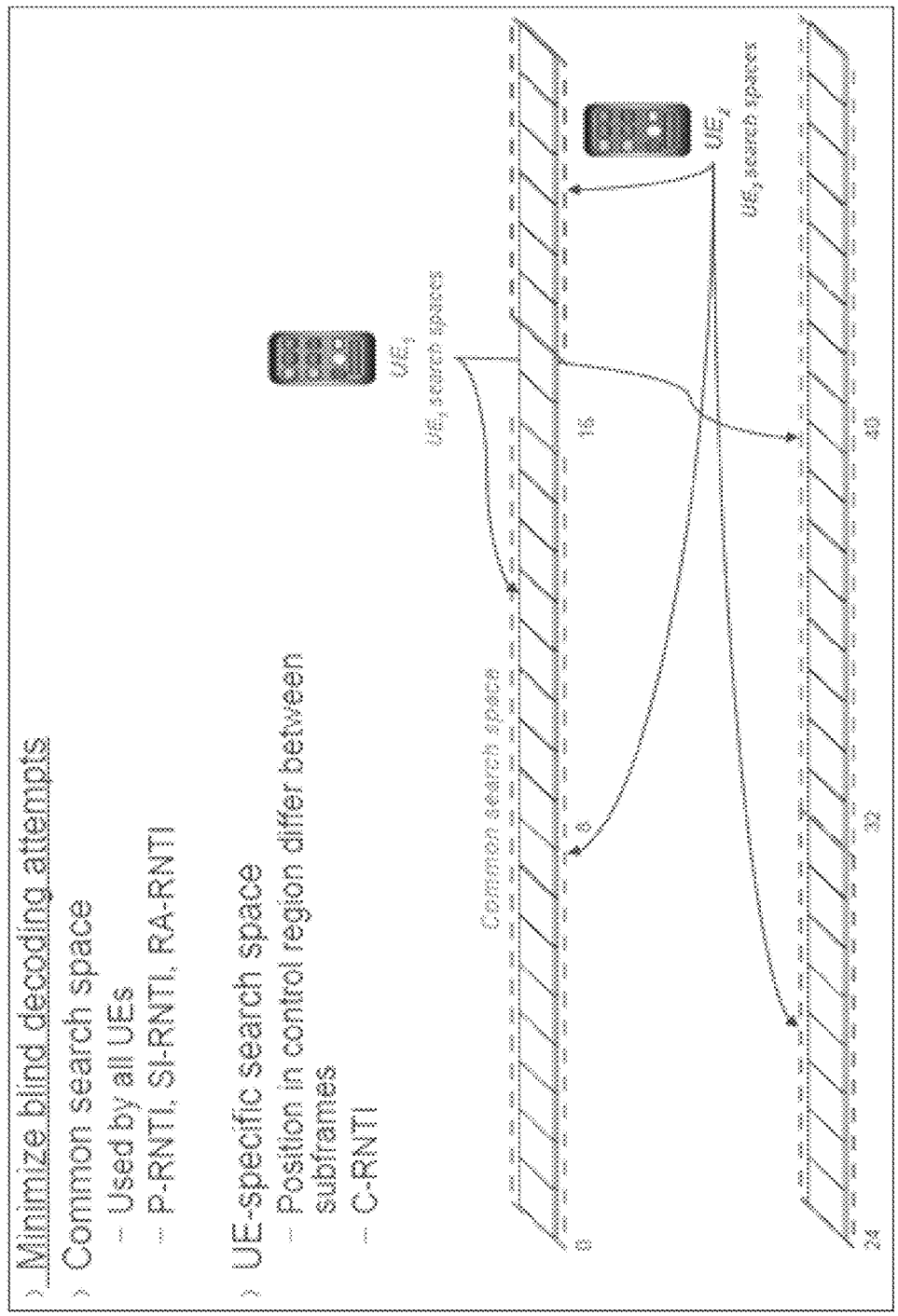
FIG. 3 illustrates one example of a common search space and a number of User Equipment device (UE) specific search spaces.
Figure 4:
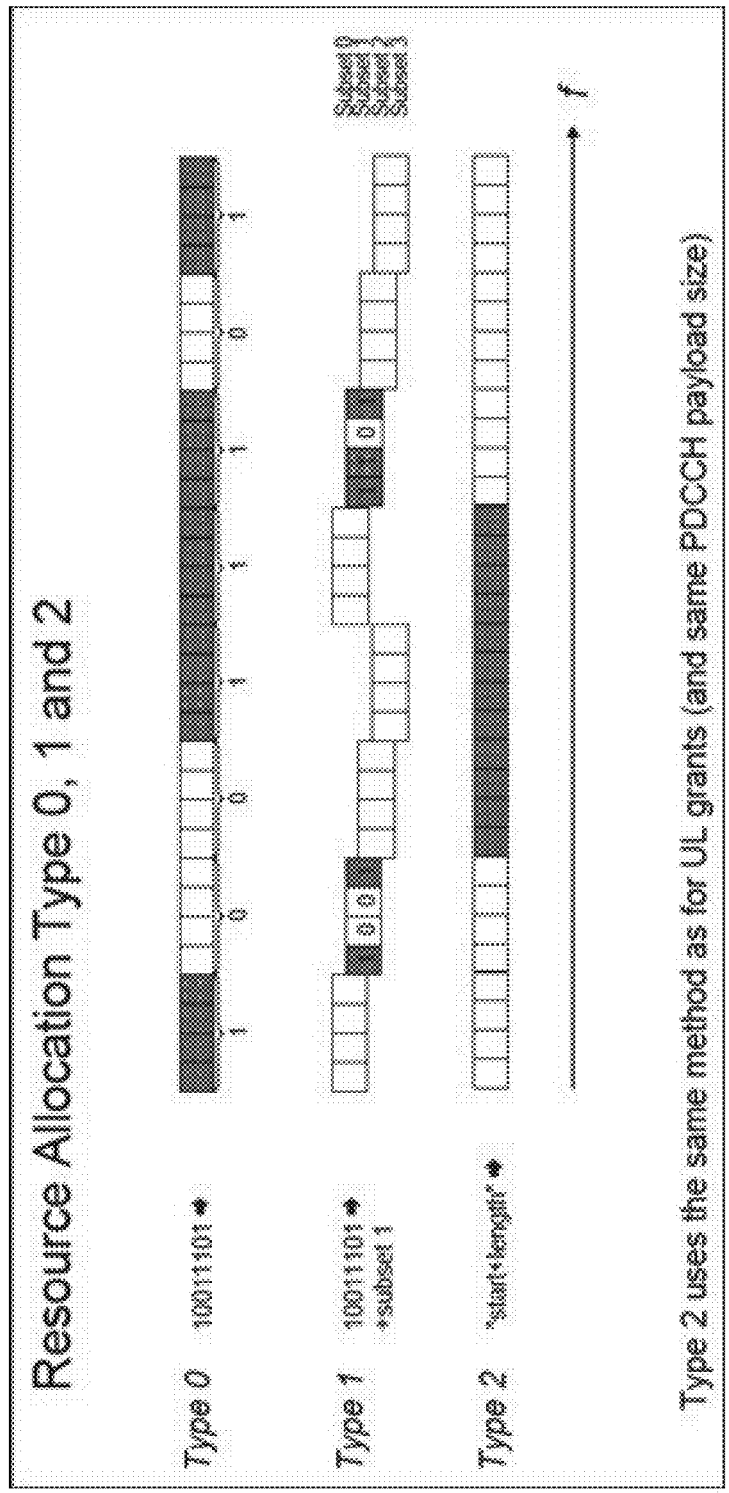
FIG. 4 illustrates three resource allocation types used by downlink assignments using different Downlink Control Information (DCI) formats.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for improving Physical Downlink Control Channel (PDCCH) allocation for improved downlink scheduling. Currently, in Third Generation Partnership Project (3GPP) Long Term Evolution (LTE), including LTE-Advanced, downlink scheduling assignment is done per Transmit Time Interval (TTI). Every User Equipment device (UE) has to decode PDCCH in each TTI/subframe in order to ascertain downlink scheduling information. So, even if the UE is scheduled for the downlink in continuous, or consecutive, TTIs, the UE must still decode PDCCH in every TTI. This implies that a PDCCH is being used to schedule the UE in every TTI. Likewise, for a given UE scheduled for the downlink in consecutive TTIs, the network, or enhanced or evolved Node B (eNB), must transmit PDCCH to the UE in each of those consecutive TTIs.

To elucidate the problem, consider a case where the eNB has many Guaranteed Bit Rate (GBR) enhanced or evolved Radio Access Bearers (ERABs) such as those for many UEs utilizing Voice over LTE (VoLTE) services. The eNB needs to schedule all VoLTE UEs frequently to fulfill the packet delay budget of the GBR ERABs as per the defined Quality of Service Class Identifier (QCI). Using conventional downlink scheduling assignment requiring PDCCHs in each TTI, with too many VoLTE UEs, PDCCH resources can be highly utilized due to too frequent scheduling while Physical Resource Block (PRB) utilization can be typically low because of low data rate of QCI bearers. This can actually starve the best effort (non-GBR) services due to inadequate PDCCH Control Channel Elements (CCEs) while PRBs are free to actually carry the data.

Systems and methods are disclosed herein for addressing these issues associated with conventional downlink scheduling assignments. In particular, in some embodiments, a new Downlink Control Information (DCI) format is provided that enables a single downlink assignment for downlink transmissions to a UE during multiple continuous, or consecutive, TTIs. In this way, the eNB does not need to transmit, and the UE does not need to receive/decode, PDCCH in each of the assigned TTIs. In some embodiments, the downlink assignment assigns the same PRBs to the UE in each of the multiple consecutive TTIs. Further, in some embodiments, the UE decodes the Physical Control Format Indicator Channel (PCFICH) in each TTI to determine the start of the data region within the corresponding subframe. In this way, the eNB does not have to create and transmit a PDCCH to the UE for each TTI and, therefore, will have more PDCCH resources available for other UEs. This is particularly beneficial when handling VoLTE UEs as they use very few PRBs for data but conventionally require PDCCH for every TTI. PRB utilization will also be improved.

Figure 5:
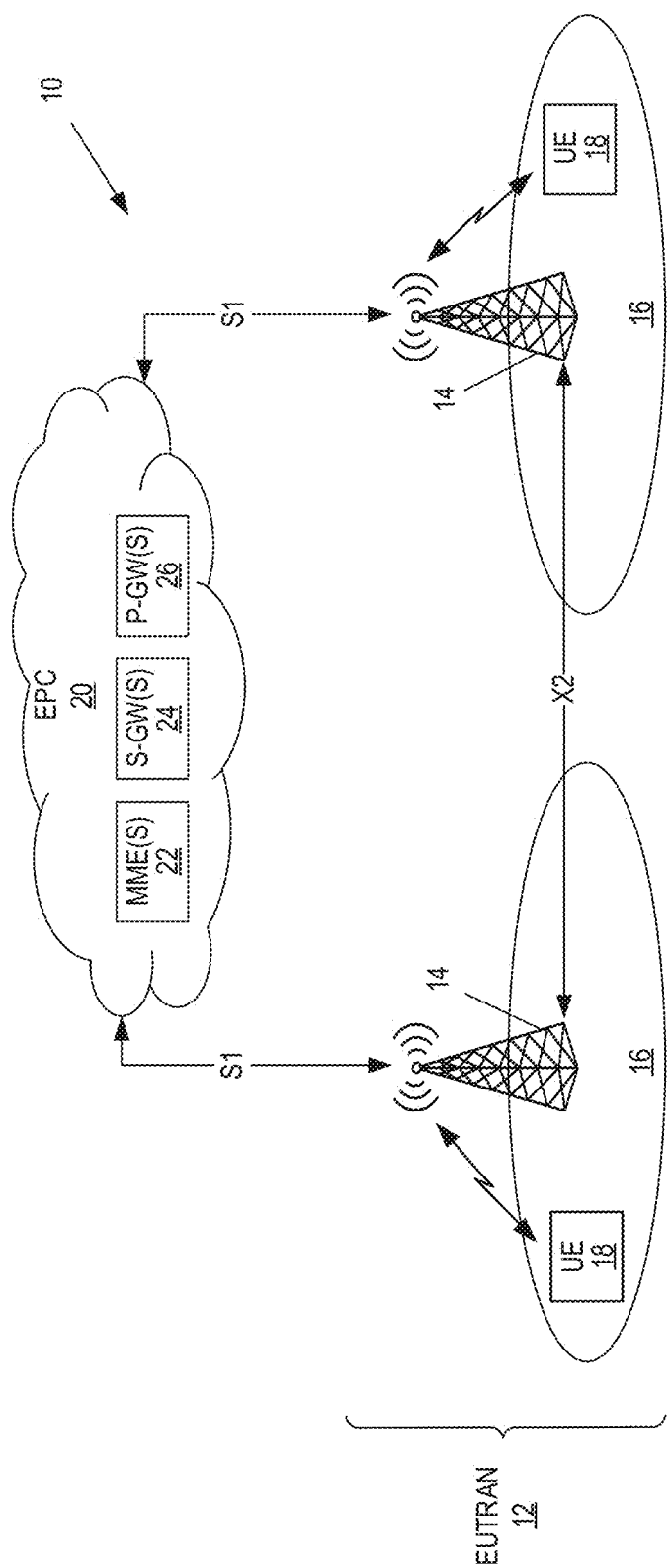
FIG. 5 illustrates one example of a cellular communications network enabling multiple Transmit Time Interval (TTI) downlink assignments according to some embodiments of the present disclosure.

In this regard, FIG. 5 illustrates one example of a cellular communications network 10 enabling multi-TTI downlink assignments according to some embodiments of the present disclosure. This description focuses on embodiments in which the cellular communications network 10 is a 3GPP LTE network. As such, 3GPP LTE terminology is oftentimes used herein. However, the present disclosure is not limited to LTE. Rather, the concepts disclosed herein can be utilized in any suitable type of cellular communications network. It should also be noted that, as used herein, LTE refers to both LTE and LTE-Advanced.

As illustrated in FIG. 5, the cellular communications network 10 includes a Radio Access Network (RAN), which in this example is an Evolved Universal Terrestrial Radio Access Network (EUTRAN) 12. The EUTRAN 12 includes a number of eNBs 14 (or more generally base stations or even more generally radio access nodes) controlling corresponding cells 16. Notably, the EUTRAN 12 may also include other types of radio access nodes (e.g., relays, low power nodes (e.g., home eNBs), Remote Radio Heads (RRHs), etc.). Further, while only one cell 16 is illustrated for each eNB 14, the eNBs 14 may each serve multiple cells or sectors. The eNBs 14 provide radio access to UEs 18 (or more generally wireless devices) connected to the corresponding cells 16. The eNBs 14 communicate via a base station to base station interface, which in LTE is referred to as a X2 interface.

The eNBs 14 are connected to a core network 20 via S1 interfaces. In this example, the core network 20 is an Evolved Packet Core (EPC) network 20. The EPC network 20 includes various nodes such as, for example, one or more Mobility Management Entities (MMEs) 22, one or more Serving Gateways (S-GWs) 24, and one or more Packet Gateways (P-GWs) 26. The MME(s) 22 is the control plane of the EPC network 20. Functions of the MME(s) 22 include, for example, connection and release of bearers to the UEs 18, handling of IDLE to ACTIVE transitions, and handling of security keys. The S-GW(s) 24 is the user-plane node connecting the EPC network 20 to the EUTRAN 12. The S-GW(s) 24 operates a mobility anchor when the UEs 18 move between the eNBs 14 as well as a mobility anchor for other 3GPP Radio Access Technologies (RATs). The P-GW(s) 26 connect the EPC network 20 to the Internet. The P-GW(s) 26 provides functions such as, for example, allocation of Internet Protocol (IP) addresses for the UEs 18, Quality of Service (QoS) enforcement, etc. The EPC network 20 includes other types of nodes (e.g., Policy and Charging Rules Function (PCRF), etc.) that are not shown for simplicity and ease of discussion.

Figure 6:
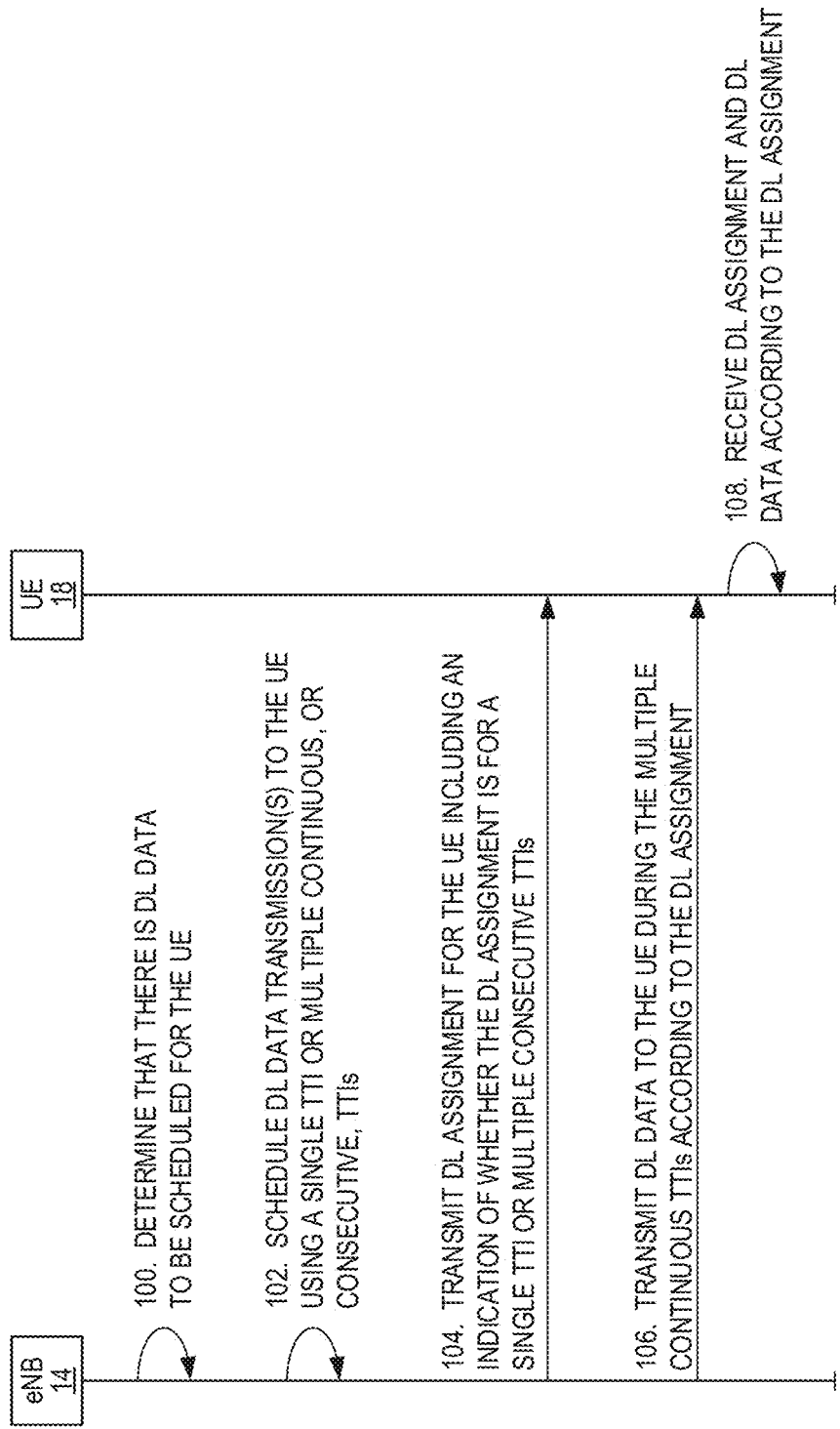
FIG. 6 is a diagram that illustrates the operation of one of the enhanced or evolved Node B (eNBs) and one of the UEs of FIG. 5 according to some embodiments of the present disclosure.

FIG. 6 is a diagram that illustrates the operation of one of the eNBs 14 and one of the UEs 18 of FIG. 5 according to some embodiments of the present disclosure. Notably, processes are generally described herein as including "steps;" however, these "steps," while being illustrated in a particular order, may be performed in any desired order unless otherwise stated herein or required. Further, some "steps" may be performed in parallel.

As illustrated, the eNB 14 determines that there is downlink data to be scheduled for transmission to the UE 18 (step 100). This determination may, for example, be made in the conventional manner. The eNB 14 then schedules a single downlink data transmission for the UE 18 for a single TTI or multiple downlink data transmissions for the UE 18 using multiple continuous, or consecutive, TTIs (step 102). The eNB 14 then transmits a downlink assignment to the UE 18 including an indication of whether the downlink assignment is applicable to a single TTI or multiple consecutive TTIs (step 104). Further, in some embodiments, the indication included in the downlink assignment indicates the number of consecutive TTIs.

More specifically, in some embodiments, the downlink assignment is transmitted in a DCI message according to a new DCI format. The new DCI format includes the indication of whether the downlink assignment is applicable to one TTI or multiple consecutive TTIs. Where the downlink assignment is applicable to multiple consecutive TTIs, the indication also indicates the number of consecutive TTIs to which the downlink assignment applies. In particular, in some embodiments, the indication is one or more bits, where different values assigned to the one or more bits map (e.g., via a predefined mapping such as a mapping defined by a standard) to information indicative of whether the downlink assignment applies to one TTI or multiple consecutive TTIs. In one particular example, the DCI message is, e.g., the same as DCI format 1 with two additional bits. These two bits represent, via a predefined mapping, the following information:

| Bit 0 | Bit 1 | Information |
|---|---|---|
| 0 | 0 | Single TTI assignment - legacy operation |
| 0 | 1 | Downlink assignment applicable to the initial TTI in which the downlink assignment was received and to next 1 TTI (i.e., 2 total consecutive TTIs) |
| 1 | 0 | Downlink assignment applicable to the initial TTI in which the downlink assignment was received and to next 2 TTIs (i.e., 3 total consecutive TTIs) |
| 1 | 1 | Downlink assignment applicable to the initial TTI in which the downlink assignment was received and to next 3 TTIs (i.e., 4 total consecutive TTIs) |

In this example, it is assumed that the radio conditions for the UE 18 for the PRBs assigned by the downlink assignment will not change drastically within 3 milliseconds (ms) (within the maximum number of additional TTIs, which in this example is 3). As such, only two bits are needed for the indication of the number of consecutive TTIs to which the downlink assignment applies. This is a reasonable assumption as typical GBR services (e.g., VoLTE) use a less aggressive, or more robust, modulation scheme and will, therefore, be more tolerant to channel fading conditions.

Like conventional downlink assignments, the downlink assignment of step 104 includes additional information needed by the UE 18 to receive the downlink data transmission(s) on the Physical Downlink Shared Channel (PDSCH) such as, e.g., resource block assignment, Modulation and Coding Scheme (MCS), etc. However, if the downlink assignment is applicable to multiple consecutive TTIs (i.e., the current/initial TTI and one or more additional TTIs immediately following the current TTI), the downlink assignment including the assigned resource blocks, MCS, etc. are applicable to not only the current TTI but also the one or more additional TTIs immediately following the current TTI. Again, the number of consecutive TTIs (which includes the current/initial TTI and the one or more additional TTIs immediately following the current/initial TTI) to which the downlink assignment is applicable is indicated by the downlink assignment (e.g., by the two additional bits as described above).

The eNB 14 transmits the one or more downlink data transmissions to the UE 18 according to the downlink assignment (step 106). The UE 18 receives (i.e., decodes) the downlink assignment and receives the downlink data transmission(s) according to the downlink assignment (step 108). More specifically, as discussed below, assuming that the downlink assignment is in the new DCI format, the UE 18 determines whether the downlink assignment is applicable to a single TTI or multiple consecutive TTIs. If the downlink assignment is applicable to a single TTI, then the UE 18 can receive the downlink data transmission from the eNB 14 in the PDSCH during the single TTI according to the downlink assignment in, e.g., the conventional manner. However, if the downlink assignment is applicable to multiple consecutive TTIs, then the UE 18 receives multiple downlink data transmissions from the eNB 14 in the PDSCH during the multiple consecutive TTIs according to the downlink assignment. Thus, in other words, if the downlink assignment is received during a first TTI, the UE 18 receives a first downlink data transmission during the first TTI according to the downlink assignment received during the first TTI, receives a second downlink data transmission during a second/next TTI according to the downlink assignment received during the first TTI, and so on.

Importantly, for each additional TTI to which the downlink assignment applies, the UE 18 does not need to monitor PDCCH in that TTI, at least for a downlink assignment. However, in some embodiments, the UE 18 does not need to monitor PDCCH in that TTI at all. Thus, in some embodiments, the UE 18 does not monitor PDCCH in the additional TTIs. Rather, in each additional TTI after the initial TTI in which the downlink assignment was received, the UE 18 only decodes PCFICH to thereby determine the position of the start of the data region in the TTI. In some embodiments, there is no UE specific information (search spaces) for the UE 18 in the additional TTIs. As discussed above, the downlink parameters (e.g., PRBs, MCS, Transport Block Size (TBS), etc.) assigned by the downlink assignment in the initial TTI are the same for the additional TTIs.

Figure 7:
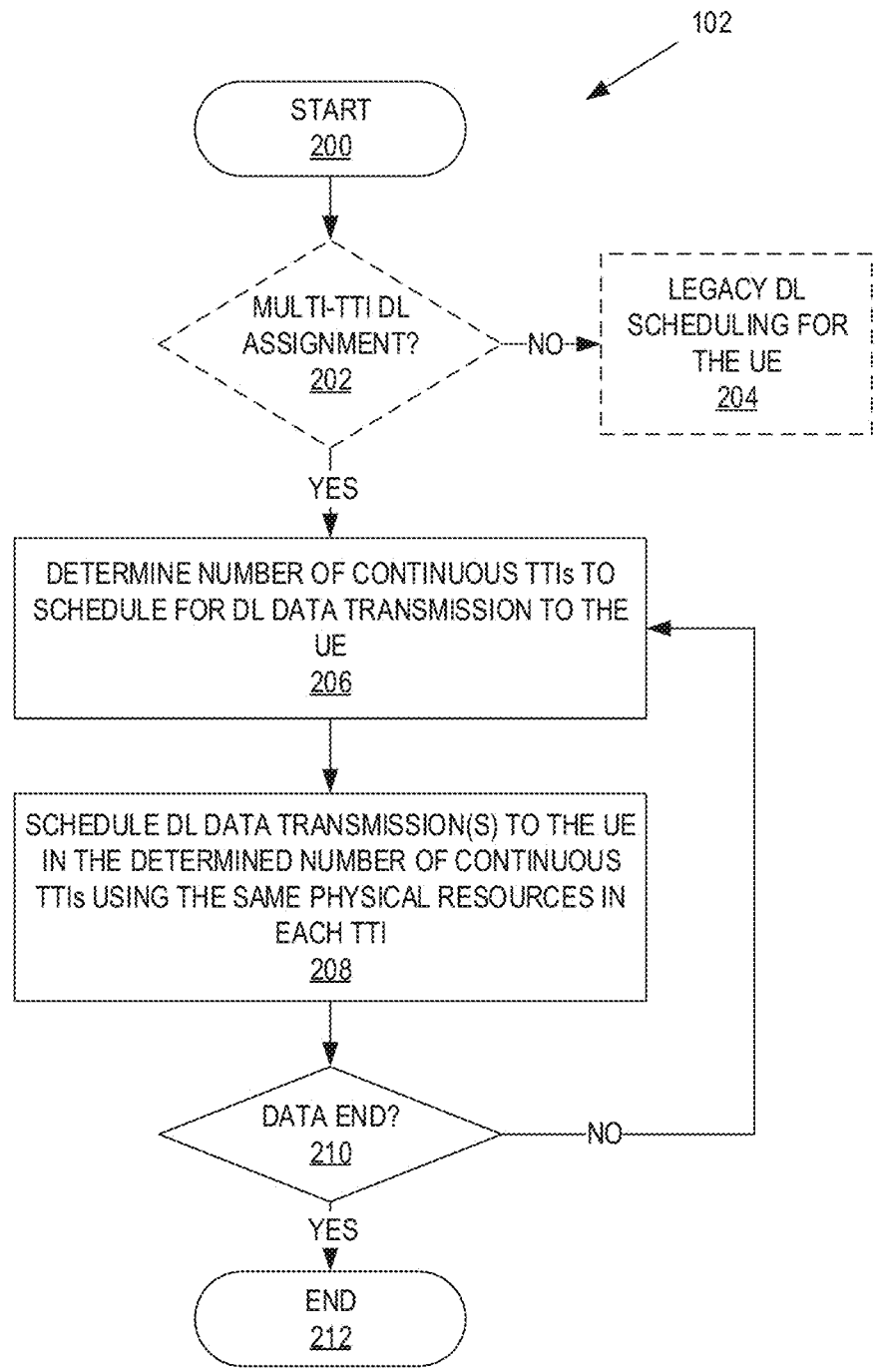
FIG. 7 is a flow chart that illustrates an eNB scheduling procedure in more detail according to some embodiments of the present disclosure.

FIG. 7 is a flow chart that illustrates the operation of the eNB 14 to schedule the downlink data transmission(s) in step 102 of FIG. 6 in more detail according to some embodiments of the present disclosure. Notably, optional steps or steps that may not be included in all embodiments are indicated by dashed lines. The process starts (step 200) upon determining that there is downlink data to schedule for the UE 18, as discussed above. The eNB 14 determines whether a multi-TTI downlink assignment procedure is to be performed (step 202). This determination may be made based upon any suitable criteria such as, for example, whether the UE 18 supports the new DCI format used for multi-TTI downlink assignment, whether the UE 18 is capable of receiving consecutive TTIs based on a single downlink assignment, radio conditions of the UE 18, a bearer type of a service bearer for the UE 18 (e.g., whether the radio bearer of the UE 18 is for a GBR service such as VoLTE), and/or a priority of the service bearer of the UE 18. If the multi-TTI downlink assignment procedure is not to be performed, the eNB 14 schedules the UE 18 using, e.g., a legacy or conventional scheduling process (step 204).

Conversely, upon determining that the multi-TTI downlink procedure is to be performed for the UE 18, the eNB 14 determines the number of continuous, or consecutive, TTIs to schedule for downlink data transmission to the UE 18 (step 206). While any suitable criterion or criteria may be used, as discussed below, in some embodiments, the number of consecutive TTIs to schedule for the UE 18 is determined based on Channel Quality Information (CQI) reported by the UE 18 for the downlink channel from the eNB 14 to the UE 18. The better the downlink channel, the greater the number of TTIs. The determined number of TTIs may be one TTI or two or more TTIs depending on, e.g., the quality of the downlink channel.

The eNB 14 then schedules downlink data transmission(s) to the UE 18 using the determined number of TTIs (step 208). As discussed above, in some embodiments, the same downlink parameters (e.g., PRBs, MCS, etc.) are used for each TTI. While not illustrated, a corresponding downlink assignment is transmitted to the UE 18, as discussed above with respect to step 104 of FIG. 6. The eNB 14 then determines whether there is more data to be scheduled for downlink transmission to the UE 18 (step 210). If so, the process returns to step 206 and is repeated. Once there is no more data to be scheduled for downlink transmission to the UE 18, the process ends (step 212).

Figure 8:
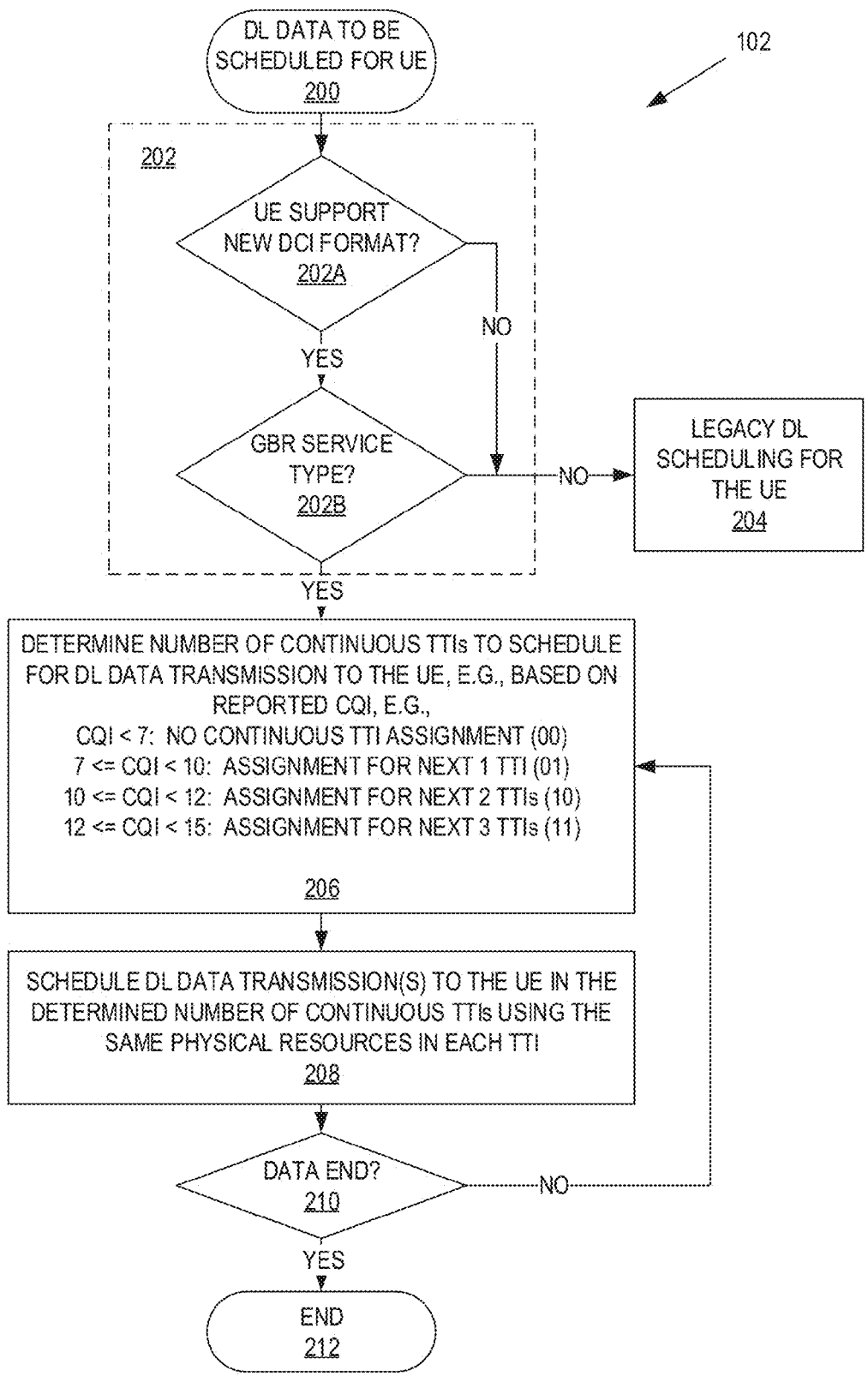
FIG. 8 is a flow chart that illustrates the process of FIG. 7 in more detail according to some embodiments of the present disclosure.

FIG. 8 illustrates the process of FIG. 7 in more detail according to some embodiments of the present disclosure. The process starts (step 200) upon determining that there is downlink data to schedule for the UE 18, as discussed above. The eNB 14 determines whether a multi-TTI downlink assignment procedure is to be performed (step 202). More specifically, in this embodiment, the eNB 14 determines whether the UE 18 supports the new DCI format (step 202A)

and whether the service type for the UE 18 is a GBR service type (e.g., VoLTE) (step 202B). As discussed above, the new DCI format is a DCI format that includes an indication of whether the downlink assignment is applicable to a single TTI or multiple consecutive TTIs. If the UE 18 does not support the new DCI format or if the service type of the UE 18 is a non-GBR service type, then the eNB 14 schedules the UE 18 using, e.g., a legacy or conventional scheduling process (step 204).

Conversely, upon determining that the UE 18 supports the new DCI format and the service type of the UE 18 is a GBR service type, the eNB 14 determines the number of continuous, or consecutive, TTIs to schedule for downlink data transmission to the UE 18 (step 206). In this example, the eNB 14 determines the number of consecutive TTIs based on CQI reported by the UE 18 for the downlink channel. As an example, the eNB 14 may determine the number of consecutive TTIs as follows:

| CQI | Number of Consecutive TTIs | DCI Bit Values |
|---|---|---|
| CQI < 7 | 1 (i.e., single TTI assignment) | 00 |
| 7 <= CQI < 10 | 2 (i.e., initial TTI and one additional TTI for total of two consecutive TTIs) | 01 |
| 10 <= CQI < 12 | 3 (i.e., initial TTI and two additional TTIs for total of three consecutive TTIs) | 10 |
| 12 <= CQI < 15 | 4 (i.e., initial TTI and three additional TTIs for total of four consecutive TTIs) | 11 |

The eNB 14 then schedules downlink data transmission(s) to the UE 18 using the determined number of TTIs (step 208). As discussed above, in some embodiments, the same downlink parameters (e.g., PRBs, MCS, etc.) are used for each TTI. While not illustrated, a corresponding downlink assignment is transmitted to the UE 18, as discussed above with respect to step 104 of FIG. 6. The eNB 14 then determines whether there is more data to be scheduled for downlink transmission to the UE 18 (step 210). If so, the process returns to step 206 and is repeated. Once there is no more data to be scheduled for downlink transmission to the UE 18, the process ends (step 212).

FIG. 9 is a graphical illustration of multi-TTI downlink assignment according to one example of the present disclosure. In this example, the new DCI format including a 2-bit indication of the number of consecutive TTIs to which the downlink assignment applies is used. FIG. 9 assumes downlink transmissions are scheduled for the UE 18 for multiple consecutive TTIs regardless of whether a multi-TTI downlink assignment is used. As illustrated, for the single TTI assignment scenario (DCI bits 00), each TTI includes both a downlink assignment for the UE 18 for that TTI and a corresponding downlink data transmission. For the two TTI assignment scenario (DCI bits 01), the first/initial TTI includes both a downlink assignment for the UE 18 for two consecutive TTIs and a downlink data transmission, but the next TTI includes only a downlink data transmission for the UE 18, but no downlink assignment for the UE 18. For the three TTI assignment scenario (DCI bits 10), the first/initial TTI includes both a downlink assignment for the UE 18 for three consecutive TTIs and a downlink data transmission, but the next two TTIs include only downlink data transmissions for the UE 18, but no downlink assignments for the UE 18. Lastly, for the four TTI assignment scenario (DCI bits 11), the first/initial TTI includes both a downlink assignment for the UE 18 for four consecutive TTIs and a downlink data transmission, but the next three TTIs include only downlink data transmissions for the UE 18, but no downlink assignments for the UE 18.

Figure 10:
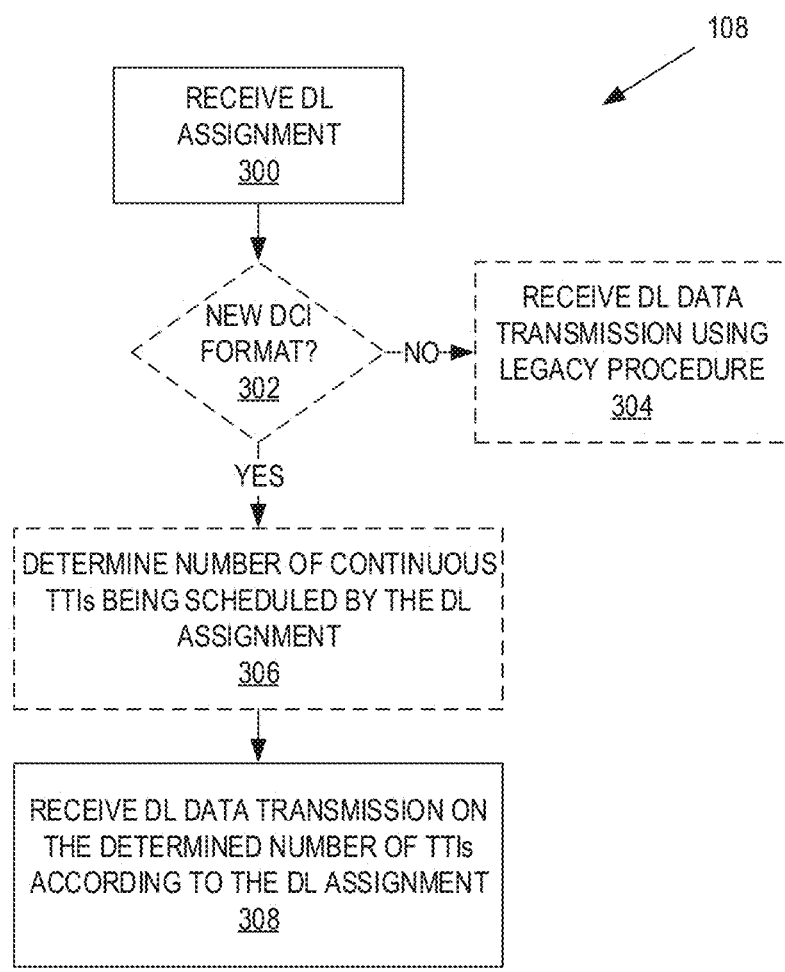
FIG. 10 is a flow chart that illustrates the operation of the UE in more detail according to some embodiments of the present disclosure.

FIG. 10 is a flow chart that illustrates the operation of the UE 18 in step 108 of FIG. 6 in more detail according to some embodiments of the present disclosure. As illustrated, the UE 18 receives, and decodes, a downlink assignment from the eNB 14 (step 300). In some embodiments, the UE 18 determines whether the downlink assignment is in the new DCI format (step 302). In other words, the UE 18 determines whether the downlink assignment includes an indication of whether the downlink assignment applies to a single TTI or multiple consecutive TTIs. If the downlink assignment is not in the new DCI format, the UE 18 receives a downlink data transmission from the eNB 14 according to the downlink assignment in the conventional or legacy manner (step 304).

If the downlink assignment is in the new DCI format, in some embodiments, the UE 18 determines the number of consecutive TTIs to which the downlink assignment applies (step 306). Alternatively, the new DCI format may apply to a predefined (e.g., predefined by standard or predefined by, e.g., the network operator) number of TTIs. As discussed above, in some embodiments, the indication in the downlink assignment (i.e., in the new DCI format) is an indication of the number of consecutive TTIs to which the downlink assignment applies. In this case, the UE 18 uses the indication and, e.g., a predefined mapping to determine the number of consecutive TTIs to which the downlink assignment applies.

The UE 18 receives the downlink transmission(s) on the number of consecutive TTIs according to the downlink assignment (step 308). More specifically, if the number of consecutive TTIs is one, then the UE 18 receives the downlink data transmission in the initial TTI according to the downlink assignment, e.g., in the legacy manner. Conversely, if the number of TTIs to which the downlink assignment applies is greater than or equal to two, then the UE 18 receives a first downlink data transmission in the initial TTI according to the downlink assignment, receives a second downlink data transmission in the next TTI according to the same downlink assignment, and so on.

As discussed above, if the downlink assignment applies to multiple consecutive TTIs, the UE 18, in some embodiments, does not decode PDCCH in the additional TTI(s) to which the downlink assignment applies. In other words, the UE 18 refrains from decoding PDCCH in the additional TTI(s) to which the downlink assignment applies. One way to accommodate this is for the same downlink parameters (e.g., PRBs, MCS, etc.) to be used for the downlink transmissions in all of the consecutive TTIs to which the downlink assignment applies. Notably, the eNB 14 takes care of transmit diversity while assigning PRBs to the UE 18. For each additional TTI to which the downlink assignment applies, the UE 18 determines the starting position of the data region for the TTI by, for example, decoding PCFICH. Further, in some embodiments, the UE 18 has no UE specific search spaces in the additional TTIs since the UE 18 does not decode, or at least does not have to decode, PDCCH for downlink assignments in those TTIs.

The multi-TTI downlink assignment schemes disclosed herein provide a number of advantages over conventional single-TTI downlink assignment. While not being limited to or by any advantages, some of these advantages are discussed below. Since PDCCHs are not assigned to the UE 18 in the additional TTI(s) to which the multi-TTI downlink assignment applies, the PDCCH bandwidth can be used for other UEs. This can be very useful in reducing PDCCH congestion. Additionally, the remaining PRBs (not assigned for the consecutive TTIs) can be assigned to other UEs, thereby improving PDSCH utilization and providing better overall throughput.

One example scenario in which multi-TTI downlink assignment may be beneficial is as follows. When there are many UEs with GBR ERABs like VoLTE UEs, the eNB 14 (and in particular the eNB scheduler) has to schedule all VoLTE UEs very frequently to fulfill the guaranteed bit rate and delay of the GBR ERABs as defined in the QoS profile. However, the data requirement for services like VoLTE actually requires a small number of PRBs. This leaves a substantial number of available PRBs which could not be assigned to other UEs due to lack of PDCCH channels if using conventional single-TTI downlink assignments. In this scenario, if the UEs for which downlink transmissions are desired in consecutive TTIs are instead assigned using multi-TTI downlink assignments as described herein, PDCCH is not required in each TTI for each of those UEs. As a result, the PDCCH resources in the additional TTIs scheduled by the multi-TTI downlink assignments that would have otherwise been required for those UEs can instead be used to schedule other UEs with the remaining PRBs leading to better utilization of both PDCCH and PRBs.

Figure 11:
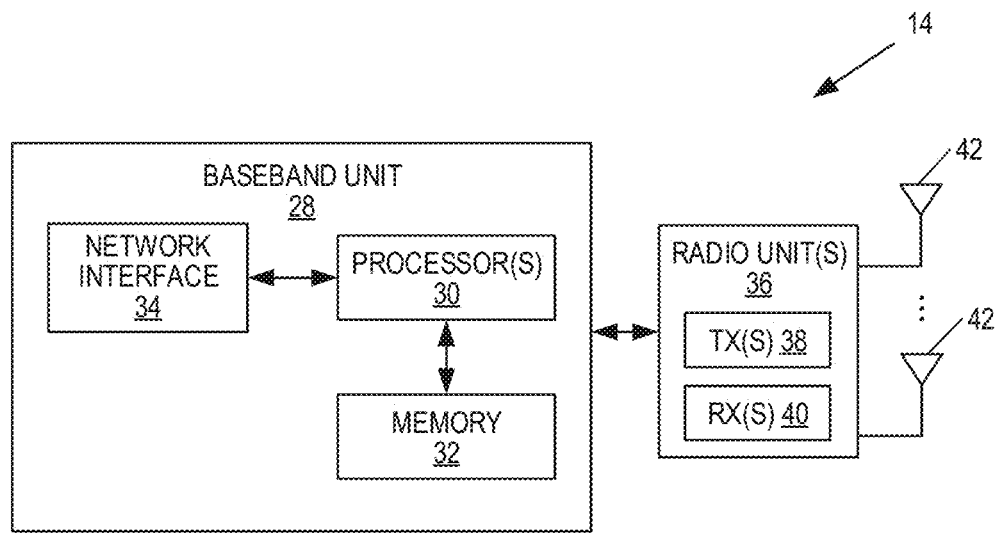
FIGS. 11 and 12 illustrate embodiments of the eNB of FIG. 5 according to some embodiments of the present disclosure.

FIG. 11 is a block diagram of the eNB 14 according to some embodiments of the present disclosure. This discussion is more generally applicable to any radio access node. As illustrated, the eNB 14 includes a baseband unit 28 including at least one processor 30 (also referred to as a processor circuit or processor circuitry) (e.g., microprocessor(s), Central Processing Unit(s) (CPU(s)), Application Specific Integrated Circuit(s) (ASIC(s)), Field Programmable Gate Array(s) (FPGA(s)), or the like), memory 32, and a network interface 34 as well as at least one radio unit 36 including one or more transmitters 38 and one or more receivers 40 coupled to multiple antennas 42. In some embodiments, the functionality of the eNB 14 is implemented in software and stored in the memory 32. This software is executable by the processor(s) 30, whereby the eNB 14 operates according to any of the embodiments described herein.

In some embodiments, a computer program including instructions which, when executed by at least one processor, causes the at least one processor to carry out the functionality of the eNB 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 32).

Figure 12:
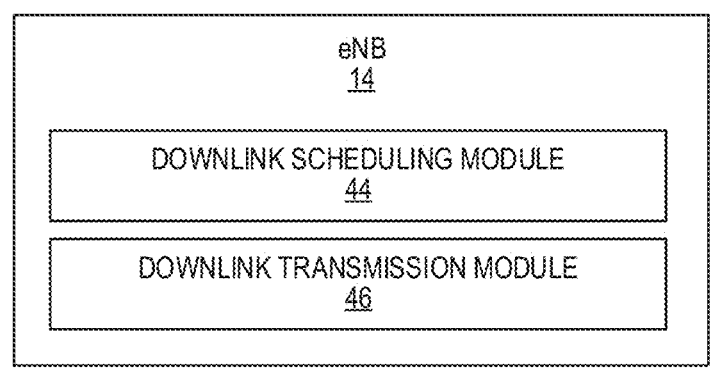

FIG. 12 is a block diagram of the eNB 14 according to other embodiments of the present disclosure. The eNB 14 includes a downlink scheduling module 44 and a downlink transmission module 46, each of which is implemented in software. The downlink scheduling module 44 operates to perform downlink scheduling according to any of the embodiments described herein. The downlink transmission module 46 operates to transmit, via an associated transmitter(s) of the eNB 14 (not shown), a downlink including downlink assignments and downlink data transmissions according to any of the embodiments described herein.

Figure 13:
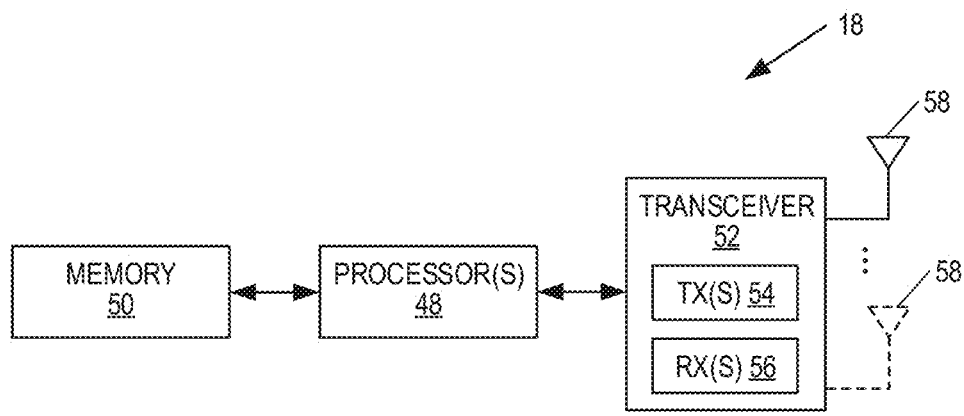
FIGS. 13 and 14 illustrate embodiments of the UE of FIG. 5 according to some embodiments of the present disclosure.

FIG. 13 is a block diagram of the UE 18 according to some embodiments of the present disclosure. As illustrated, the UE 18 includes at least one processor 48 (also referred to as a processor circuit or processor circuitry) (e.g., microprocessor(s), CPU(s), ASIC(s), FPGA(s), or the like), memory 50, and a transceiver 52 including one or more transmitters 54 and one or more receivers 56 coupled to at least one antenna 58. In some embodiments, the functionality of the UE 18 is implemented in software and stored in the memory 50. This software is executable by the processor(s) 48, whereby the UE 18 operates according to any of the embodiments described herein.

In some embodiments, a computer program including instructions which, when executed by at least one processor, causes the at least one processor to carry out the functionality of the UE 18 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 50).

Figure 14:
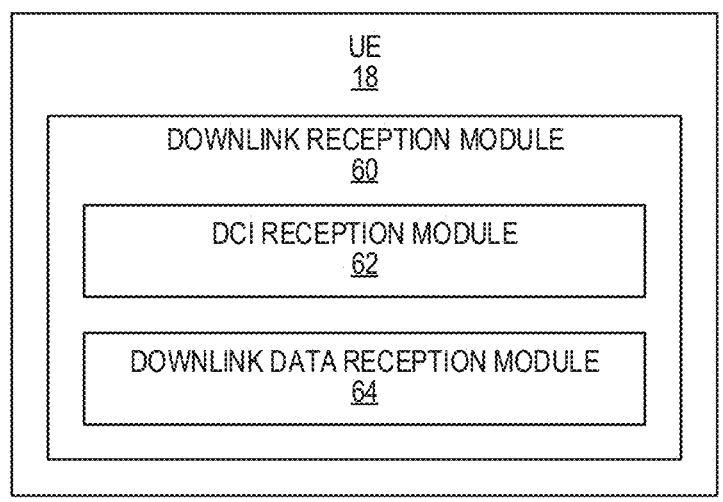

FIG. 14 is a block diagram of the UE 18 according to other embodiments of the present disclosure. As illustrated, the UE 18 includes a downlink reception module 60, which is implemented in software. The downlink reception module 60 includes a DCI reception module 62 (or more generally downlink assignment reception module) and a downlink data reception module 64, which operate to receive and decode a DCI message containing a downlink assignment and to receive a downlink data transmission(s) according to the downlink assignment according to any of the embodiments described herein.

The following acronyms are used throughout this disclosure.
- 3GPP Third Generation Partnership Project
- ASIC Application Specific Integrated Circuit
- CCE Control Channel Element
- CPU Central Processing Unit
- CQI Channel Quality Information
- CRC Cyclic Redundancy Check
- C-RNTI Cell Radio Network Temporary Identifier
- DAI Downlink Assignment Index
- DCI Downlink Control Information
- eNB Enhanced or Evolved Node B
- EPC Evolved Packet Core
- ePDCCH Enhanced Physical Downlink Control Channel
- ERAB Enhanced or Evolved Radio Access Bearer
- EUTRAN Evolved Universal Terrestrial Radio Access Network
- FDD Frequency Division Duplexing
- FPGA Field Programmable Gate Array
- GBR Guaranteed Bit Rate
- HARQ Hybrid Automatic Repeat Request
- ID Identifier
- IP Internet Protocol
- LTE Long Term Evolution
- MAC Medium Access Control
- MCS Modulation and Coding Scheme
- MIMO Multiple Input Multiple Output
- MME Mobility Management Entity
- ms Millisecond
- OFDM Orthogonal Frequency Division Multiplexing
- PCFICH Physical Control Format Indicator Channel
- PCRF Policy and Charging Rules Function
- PDCCH Physical Downlink Control Channel
- PDSCH Physical Downlink Shared Channel
- P-GW Packet Gateway
- PHICH Physical Hybrid Automatic Repeat Request Indicator Channel
- PRB Physical Resource Block
- P-RNTI Paging Radio Network Temporary Identifier
- PUCCH Physical Uplink Control Channel
- PUSCH Physical Uplink Shared Channel
- QCI Quality of Service Class Identifier
- QoS Quality of Service
- QPSK Quadrature Phase Shift Keying
- RAN Radio Access Network
- RA-RNTI Random Access Radio Network Temporary Identifier
- RAT Radio Access Technology
- REG Resource Element Group
- RIV Resource Indication Value
- RNTI Radio Network Temporary Identifier
- RRH Remote Radio Head
- RV Redundancy Version
- S-GW Serving Gateway
- SI-RNTI System Information Radio Network Temporary Identifier
- TBS Transport Block Size
- TDD Time Division Duplexing
- TPC Transmit Power Control
- TTI Transmit Time Interval
- UE User Equipment
- VoLTE Voice over Long Term Evolution
- VRB Virtual Resource Block Those skilled in the art will recognize improvements and modifications to the embodiments of the present disclosure. All such improvements and modifications are considered within the scope of the concepts disclosed herein and the claims that follow.

What is claimed is:

1. A method of operation of a network node in a cellular communications network, comprising:
    transmitting a downlink assignment to a wireless device, the downlink assignment comprising an indication of whether the downlink assignment applies to a single transmit time interval or multiple consecutive transmit time intervals;
    transmitting a downlink data transmission to the wireless device during a single transmit time interval or multiple downlink data transmissions to the wireless device during multiple consecutive transmit time intervals according to the downlink assignment where the multiple downlink data transmissions comprise at least two different data values;
    determining whether the wireless device supports multiple transmit time interval downlink assignment;
    determining whether a service type of a service associated with the downlink transmission to the wireless device is a guaranteed bit rate service type; and
    upon determining that the wireless device supports multiple transmit time interval downlink assignment and determining that the service type of the service associated with the downlink transmission to the wireless device is a guaranteed bit rate service type:
        determining a number of consecutive transmit time intervals to be scheduled for downlink data transmission to the wireless device, the determined number of consecutive transmit time intervals being greater than or equal to 1; and
        scheduling the multiple downlink data transmissions to the wireless device during the determined number of consecutive transmit time intervals.

2. The method of claim 1 wherein the indication in the downlink assignment indicates that the downlink assignment applies to multiple consecutive transmit time intervals, and transmitting comprises transmitting multiple downlink data transmissions to the wireless device during the multiple consecutive transmit time intervals according to the downlink assignment.

3. The method of claim 2 wherein the downlink assignment assigns the same physical resources for the multiple downlink data transmissions in the multiple consecutive transmit time intervals.

4. The method of claim 2 wherein:
transmitting the downlink assignment to the wireless device comprises transmitting the downlink assignment to the wireless device during a first transmit time interval of the multiple consecutive transmit time intervals; and
transmitting the multiple downlink data transmissions to the wireless device during the multiple consecutive transmit time intervals comprises:
transmitting a first downlink data transmission to the wireless device during the first transmit time interval according to the downlink assignment transmitted during the first transmit time interval; and
transmitting a second downlink data transmission to the wireless device during a second transmit time interval of the multiple consecutive transmit time intervals according to the downlink assignment transmitted during the first transmit time interval.

5. The method of claim 1 wherein transmitting the downlink assignment to the wireless device comprises transmitting the downlink assignment to the wireless device via a downlink control information message comprising the indication of whether the downlink assignment applies to a single transmit time interval or multiple consecutive transmit time intervals.

6. The method of claim 5 wherein, if the indication indicates that the downlink assignment applies to multiple consecutive transmit time intervals, the indication is further indicative of the number of consecutive transmit time intervals in the multiple consecutive transmit time intervals.

7. The method of claim 1 wherein, if the indication indicates that the downlink assignment applies to multiple consecutive transmit time intervals, the indication is further indicative of the number of consecutive transmit time intervals in the multiple consecutive transmit time intervals.

8. The method of claim 1 wherein determining the number of consecutive transmit time intervals comprises determining the number of consecutive transmit time intervals to be scheduled for downlink data transmission to the wireless device based on channel quality information reported by the wireless device.

9. The method of claim 1 wherein scheduling the downlink data transmissions to the wireless device for the multiple consecutive transmit time intervals further comprises:
determining whether a multiple transmit time interval assignment procedure is to be performed for the wireless device;
wherein determining the number of consecutive transmit time intervals to be scheduled for downlink data transmission to the wireless device and scheduling the multiple downlink data transmissions to the wireless device during the determined number of consecutive transmit time intervals are performed upon determining that the multiple transmit time interval assignment procedure is to be performed for the wireless device.

10. The method of claim 1 wherein the determined number of consecutive transmit time intervals is greater than or equal to 2.

11. A network node for a cellular communications network, comprising:
at least one radio unit;
one or more processors; and
memory storing instructions executable by the one or more processors whereby the network node is operative to:
transmit, via the at least one radio unit, a downlink assignment to a wireless device, the downlink assignment comprising an indication of whether the downlink assignment applies to a single transmit time interval or multiple consecutive transmit time intervals;
transmit, via the at least one radio unit, a downlink data transmission to the wireless device during a single transmit time interval or multiple downlink data transmissions to the wireless device during multiple consecutive transmit time intervals according to the downlink assignment where the multiple downlink data transmissions comprise at least two different data values;
determine whether the wireless device supports multiple transmit time interval downlink assignment;
determine whether a service type of a service associated with the downlink transmission to the wireless device is a guaranteed bit rate service type; and
upon determining that the wireless device supports multiple transmit time interval downlink assignment and determining that the service type of the service associated with the downlink transmission to the wireless device is a guaranteed bit rate service type:
determine a number of consecutive transmit time intervals to be scheduled for downlink data transmission to the wireless device, the determined number of consecutive transmit time intervals being greater than or equal to 1; and
schedule the multiple downlink data transmissions to the wireless device during the determined number of consecutive transmit time intervals.

12. The network node of claim 11 wherein the indication in the downlink assignment indicates that the downlink assignment applies to multiple consecutive transmit time intervals, and the network node transmits multiple downlink data transmissions to the wireless device during the multiple consecutive transmit time intervals according to the downlink assignment.

13. The network node of claim 12 wherein the downlink assignment assigns the same physical resources for the multiple downlink data transmissions in the multiple consecutive transmit time intervals.

14. The network node of claim 11 wherein the network node is further operative to transmit the downlink assignment to the wireless device via a downlink control information message comprising the indication of whether the downlink assignment applies to a single transmit time interval or multiple consecutive transmit time intervals.

15. The network node of claim 14 wherein, if the indication indicates that the downlink assignment applies to multiple consecutive transmit time intervals, the indication is further indicative of the number of consecutive transmit time intervals in the multiple consecutive transmit time intervals.

16. The network node of claim 11 wherein, if the indication indicates that the downlink assignment applies to multiple consecutive transmit time intervals, the indication is further indicative of the number of consecutive transmit time intervals in the multiple consecutive transmit time intervals.

17. The network node of claim 11 wherein the network node is further operative to determine a number of consecutive transmit time intervals to be scheduled for downlink data transmission to the wireless device, the determined number of consecutive transmit time intervals being greater than or equal to 1.

18. The network node of claim 17 wherein the determined number of consecutive transmit time intervals is greater than or equal to 2.

19. The network node of claim 17 wherein the network node determines the number of consecutive transmit time intervals to be scheduled for downlink data transmission to the wireless device based on channel quality information reported by the wireless device.

20. A method of operation of a wireless device in a cellular communications network, comprising:
receiving a downlink assignment from a network node, the downlink assignment comprising an indication of whether the downlink assignment applies to a single transmit time interval or multiple consecutive transmit time intervals; and
determining whether the downlink assignment is in a format that supports multiple consecutive transmit time interval assignment;
upon determining that the downlink assignment is in a format that supports multiple consecutive transmit time interval assignment:
determining a number of consecutive transmit time intervals being scheduled by the downlink assignment based on the indication comprised in the downlink assignment, the number of consecutive transmit time intervals being greater than or equal to 1;
receiving one or more downlink data transmissions on the determined number of consecutive transmit time intervals according to the downlink assignment where the multiple downlink data transmissions comprise at least two different data values.

21. The method of claim 20 wherein the indication in the downlink assignment indicates that the downlink assignment applies to multiple consecutive transmit time intervals, and receiving comprises receiving multiple downlink data transmissions during the multiple consecutive transmit time intervals according to the downlink assignment.

22. The method of claim 21 wherein the downlink assignment assigns the same physical resources for the multiple downlink data transmissions in the multiple consecutive transmit time intervals.

23. The method of claim 21 wherein:
receiving the downlink assignment comprises receiving the downlink assignment during a first transmit time interval of the multiple consecutive transmit time intervals; and
receiving the multiple downlink data transmissions during the multiple consecutive transmit time intervals comprises:
receiving a first downlink data transmission during the first transmit time interval according to the downlink assignment received during the first transmit time interval; and
receiving a second downlink data transmission during a second transmit time interval of the multiple consecutive transmit time intervals according to the downlink assignment received during the first transmit time interval.

24. The method of claim 20 wherein receiving the downlink assignment comprises receiving the downlink assignment via a downlink control information message comprising the indication of whether the downlink assignment applies to a single transmit time interval or multiple consecutive transmit time intervals.

25. The method of claim 24 wherein, if the indication indicates that the downlink assignment applies to multiple consecutive transmit time intervals, the indication is further indicative of the number of consecutive transmit time intervals in the multiple consecutive transmit time intervals.

26. The method of claim 20 wherein, if the indication indicates that the downlink assignment applies to multiple consecutive transmit time intervals, the indication is further indicative of the number of consecutive transmit time intervals in the multiple consecutive transmit time intervals.

27. A wireless device for operation in a cellular communications network, comprising:
at least one receiver;
at least one processor; and
memory containing instructions executable by the at least one processor whereby the wireless device is operative to:
receive, via the at least one receiver, a downlink assignment from a network node, the downlink assignment comprising an indication of whether the downlink assignment applies to a single transmit time interval or multiple consecutive transmit time intervals;
determine whether the downlink assignment is in a format that supports multiple consecutive transmit time interval assignment;
upon determining that the downlink assignment is in a format that supports multiple consecutive transmit time interval assignment:
determine a number of consecutive transmit time intervals being scheduled by the downlink assignment based on the indication comprised in the downlink assignment, the number of consecutive transmit time intervals being greater than or equal to 1; and
receive, via the at least one receiver, one or more downlink data transmissions on a single transmit time interval or multiple downlink data transmissions during multiple consecutive transmit time intervals according to the downlink assignment where the multiple downlink data transmissions comprise at least two different data values.

28. The wireless device of claim 27 wherein the indication in the downlink assignment indicates that the downlink assignment applies to multiple consecutive transmit time intervals, and the wireless device is further operative to receive multiple downlink data transmissions during the multiple consecutive transmit time intervals according to the downlink assignment.

29. The wireless device of claim 28 wherein the downlink assignment assigns the same physical resources for the multiple downlink data transmissions in the multiple consecutive transmit time intervals.

30. The wireless device of claim 27 wherein the wireless device is further operative to receive the downlink assignment via a downlink control information message comprising the indication of whether the downlink assignment applies to a single transmit time interval or multiple consecutive transmit time intervals.

31. The wireless device of claim 30 wherein, if the indication indicates that the downlink assignment applies to multiple consecutive transmit time intervals, the indication is further indicative of the number of consecutive transmit time intervals in the multiple consecutive transmit time intervals.

32. The wireless device of claim 27 wherein, if the indication indicates that the downlink assignment applies to multiple consecutive transmit time intervals, the indication is further indicative of the number of consecutive transmit time intervals in the multiple consecutive transmit time intervals.

\* \* \* \* \*